United States Patent [19]

Takiguchi et al.

[11] Patent Number: 4,640,952

[45] Date of Patent: Feb. 3, 1987

[54] PNEUMATIC TIRE HAVING ALL-WEATHER RUNNING PERFORMANCES

[75] Inventors: Eiji Takiguchi; Kazuaki Yuto; Toru Oniki, all of Higashikurume, Japan

[73] Assignee: Bridgestone Corporation, Tokyo, Japan

[21] Appl. No.: 721,725

[22] Filed: Apr. 10, 1985

[30] Foreign Application Priority Data

Apr. 10, 1984 [JP] Japan ................... 59-69910

[51] Int. Cl.$^4$ .......................... B60C 11/00; B60C 1/00
[52] U.S. Cl. ................... 524/296; 524/145; 524/297; 524/306; 524/315; 152/209 R
[58] Field of Search ............... 152/209 R; 524/495, 524/496, 296, 297, 306, 315, 145; 106/307; 525/237; 527/236

[56] References Cited

U.S. PATENT DOCUMENTS

| | | | |
|---|---|---|---|
| 3,973,983 | 8/1976 | Jordan et al. | 106/307 |
| 4,154,277 | 5/1979 | Sato et al. | 524/496 |
| 4,229,325 | 10/1980 | Thalen et al. | 524/296 |
| 4,261,403 | 4/1981 | Imai et al. | 152/209 R |
| 4,281,703 | 8/1981 | Almad | 524/496 |
| 4,433,094 | 2/1984 | Ogawa et al. | 152/209 R |
| 4,485,205 | 11/1984 | Fujimaki et al. | 152/209 R |
| 4,499,228 | 2/1985 | Ogawa et al. | 525/237 |
| 4,510,291 | 4/1985 | Kawakami | 152/209 R |

Primary Examiner—Michael Ball
Attorney, Agent, or Firm—Sughrue, Mion, Zinn, Macpeak, and Seas

[57] ABSTRACT

A pneumatic tire having a low fuel consumption and all-weather running performances is disclosed, which comprises a tread composed of a rubber composition containing 30–80 parts by weight of carbon black having IA of not less than 70 mg/g and DBP absorption of not less than 90 ml/100 g, based on 100 parts by weight of a rubber blend consisting of 97–10 parts by weight of at least one diene rubber having a content of bound styrene of 0–30% and a content of vinyl bond in butadiene unit of 25–95%, 3–30 parts by weight of butyl rubber and/or halogenated butyl rubber, and 0–87 parts by weight of the other diene rubber.

2 Claims, 2 Drawing Figures

PNEUMATIC TIRE HAVING ALL-WEATHER RUNNING PERFORMANCES

BACKGROUND OF THE INVENTION

1. Field of the Invention

This invention relates to a pneumatic tire having good all-weather running performances, and more particularly to a pneumatic tire having a low fuel consumption and improved all-weather running performances such as wet skid resistance, low rolling resistance, wear resistance and running performances on snow and ice roads.

2. Description of the Prior Art

Since styrene-butadiene copolymer rubbers have an excellent wet skid resistance on wet road surface and a good wear resistance, they have hitherto been widely used in tire tread. However, such rubbers are large in the energy loss and are apt to cause heat build-up, and also are large in the energy loss during the rolling, so that they are difficult to apply to low fuel consumption tires. Further, the hardening of the rubber at low temperature is considerable, and the skid performance on snow and ice roads are deteriorated, so that the application to tires on snow and ice roads is unfavorable.

As a method of simultaneously improving the wet skid resistance, the resistance to heat build-up and the rolling resistance, therefore, Japanese Patent laid open No. 57-51,503, No. 57-55,204 and No. 58-36,705 disclose the use of styrene-butadiene copolymer rubber (SBR) having the controlled contents of styrene and vinyl bond. This SBR exhibits an excellent wet skid resistance and a low fuel consumption, but is high in the glass transition temperature (Tg) and conspicuous in the rapid hardening at low temperature, so that the brittle fracture properties at low temperature are deteriorated, resulting in the degradation of skid performances on snow and ice roads.

On the other hand, although various pneumatic tires suitable for running on snow and ice roads have hitherto been proposed, their performances are not necessarily satisfied and consequently still desired to be improved. In this connection, various studies on the material of the tread portion have been made in order to improve the tread gripping force against snow and ice road surfaces, among which the reduction of rubber hardness at low temperature is well-known from C. S. Wilkerson; RCT, 27 225 (1954), F. S. Conant; RCT 22 863 (1949) and the like. For this purpose, as is known from literatures of W. G. Nörich; "The Friction of Polymer on Ice" (Journal of the IRI, October, p192, 1972), Desumond Moore; "The Friction of Pneumatic Tires" (1975) and the like, the use of butadiene rubber, natural rubber and polyisoprene rubber as tread rubber improves the tread gripping force against snow and ice road surfaces. In such a method, however, the tread gripping force against wet road surface is unfavorably reduced. Furthermore, in order to solve this reduction of the tread gripping force, as is known from literatures of A. C. Bassi; RCT 38 1965, D. Bulgin, G. D. Hubberd, M. H. Walters; Proc. 4th Rubber Tech. Conf. London, 193 (1962) and the like, there is a method of using a large amount of styrene-butadiene copolymer rubber, butyl rubber or carbon black. In this method, however, the performances on snow and ice roads and the rolling resistance are unfavorably deteriorated.

In Japanese Patent Application Publication No. 57-59,256 is disclosed that the rolling resistance and the wet skid resistance of the tire can be improved without substantially sacrificing the wear resistance by adding more than 5 but not more than 30 parts by weight of a polyisobutylene-isoprene rubber (halogenated butyl rubber) containing 1.0–2.0% by weight of chlorine (Cl) or bromine (Br), or the mixture thereof to natural rubber (NR) and polybutadiene rubber (BR). However, such a rubber composition is practically insufficient in view of the improvement of the running performances on snow and ice roads aiming at the invention. Further, Japanese Patent Application Publication No. 58-46,257 discloses that a tread rubber composition obtained by adding to a blend of natural rubber (NR), styrene-butadiene copolymer rubber (SBR) containing styrene of not more than 20% by weight and polybutadiene rubber (BR) an extender oil having a flowing point of not more than $-10°$ C. in an amount of not less than 20% by weight of total extender oil content is used in a tire for truck and bus having the ice skid resistance, the wet skid resistance and the wear resistance. Although the use of such tread rubber composition improves the ice skid resistance, the wet skid resistance and the wear resitance in the tire for truck and bus to a certain extent, it is considered to be still insufficient from the viewpoint of the levels of low fuel consumption, wet skid resistance and running performances on snow and ice roads required mainly in tires for passenger cars aiming at the invention. On the other hand, in Japanese Patent Application No. 58-79,406 and No. 58-79,407, the inventors have previously proposed a pneumatic tire using in tread a rubber composition containing an ester type low-temperature plasticizer for the purpose of improving the tread gripping force against snow and ice road surfaces without deteriorating the wet skid resistance, the wear resistance and the rolling resistance. Further, the inventors have made various studies with respect to the development of tires having the dramatically improved properties or so called all-weather running performances and confirmed the followings. That is, it is desirable to improve the tread gripping force against snow and ice roads without degrading the properties required for the existing summer tires, such as wet skid resistance, wear resistance, rolling resistance and the like. However, even in the tires having low fuel consumption and so-called all-weather running performances such as wet skid resistance, rolling resistance and running performances on snow and ice roads, the levels of the tire performances required by a user are naturally different in accordance with weather conditions in areas of actually using the tire, for example, an area where snow and ice road surfaces are formed for several days in winter season, a largely rainy area, an area where the running on snow and ice roads is preferential in winter season, and the like. As mentioned above, although there are various summer tires attached importance to the rolling resistance, the wet skid resistance or the like depending upon the levels required by the user, if not only the performance at the above each level is kept but also the running performances on snow and ice roads are improved, it can be said to be a tire with all-weather running performances satisfying the requirements of each user.

SUMMARY OF THE INVENTION

The inventors have made further studies with respect to the above properties under the above situations and found that pneumatic tires satisfying the above requirements can be obtained by adding a particular carbon black to a rubber blend of diene rubber having particular structures, butyl rubber, halogenated butyl rubber and, if necessary, the other diene rubber and using the resulting rubber composition in a tread, and as a result the invention has been accomplished.

According to the invention, there is the provision of a pneumatic tire having all-weather running performances, which comprises using in tread a rubber composition containing 30-80 parts by weight of carbon black having an iodine adsorption value (IA) of not less than 70 mg/g and a dibutyl phthalate (DBP) absorption of not less than 90 ml/100 g, based on 100 parts by weight of a rubber blend consisting of 97-10 parts by weight of at least one diene rubber having a content of bound styrene of 0-30% and a content of vinyl bond in butadiene unit of 25-95%, preferably 35-95% and $45 \leq 1.7 \times$ bound styrene %+vinyl bond %$\leq 120$, preferably $65 \leq 1.7 \times$ bound styrene %+vinyl bond %$\leq 110$, 3-30 parts by weight of butyl rubber and/or halogenated butyl rubber, and 0-87 parts by weight of other diene rubber.

DETAILED DESCRIPTION OF THE INVENTION

Figure 1:
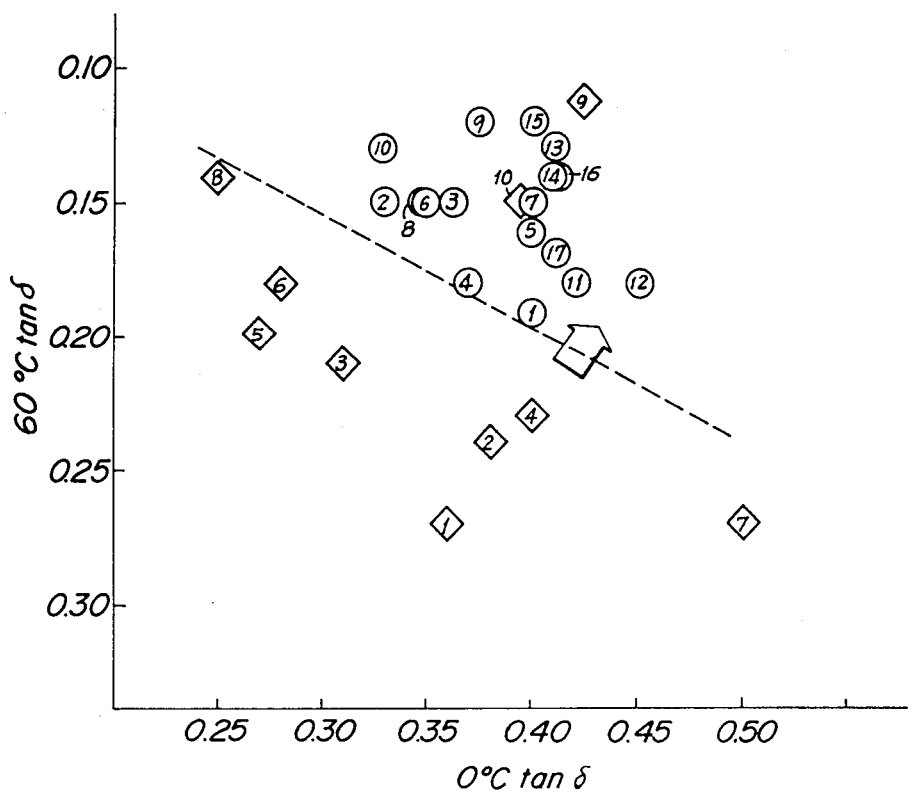
FIG. 1 is a graph showing a relation between tan $\delta$ at 0° C. and tan $\delta$ at 60° C. in rubber compositions of Examples as mentioned later.

As the diene rubber constituting the rubber composition used in the tread of the pneumatic tire according to the invention is used at least one diene rubber having a content of bound styrene of 0-30% and a content of vinyl bond in butadiene unit of 25-95% (hereinafter abbreviated as diene rubber-A). However, if the content of vinyl bond is less than 25%, the wet skid resistance is unfavorably lowered, while if the content of bound styrene and the content of vinyl bond exceed 30% and 95%, respectively, the rolling resistance and the running performances on snow and ice roads are unfavorably deteriorated, respectively. If the amount of the diene rubber-A used exceeds 97 parts by weight, the wet skid resistance and the running performances on snow and ice roads are lowered, while if it is less than 10 parts by weight, the rolling resistance and the wet skid resistance are deteriorated.

Next, if the amount of butyl rubber and/or halogenated butyl rubber used is less than 3 parts by weight, the wet skid resistance is unfavorably lowered, while if it exceeds 30 parts by weight, the running performances on snow and ice roads, the wear resistance and the rolling resitance are unfavorably deteriorated. As a result, such an amount is within a range of 3-30 parts by weight.

To the above rubber blend is compounded 30-80 parts by weight of carbon black having IA of not less than 70 mg/g and DBP absorption of not less than 90 ml/100 g. However, if the carbon black has IA of less than 70 mg/g and DBP absorption of less than 90 ml/100 g, the wear resistance is unfavorably lowered. And also, if the compounding amount is less than 30 parts by weight, the wear resistance is lowered, while if it exceeds 80 parts by weight, the rolling resistance and the running performances on snow and ice roads are unfavorably deteriorated.

In order to improve the tread gripping force against snow and ice road surfaces and reduce the rolling resistance, it is favorable that the above rubber composition is compounded with an ester type plasticizer and/or a naphthenic or paraffinic softener. In this case, the compounding amount of such an additive is preferable within a range of 2-30 parts by weight based on 100 parts by weight of the rubber content. When the amount is less than 2 parts by weight, there is little effect on the running performances on snow and ice roads and the rolling resistance, while when it exceeds 30 parts by weight, the wear resitance and the cut appearance are deteriorated, and the permanent deformation of tread blocks occurs after running on bad road, and also the improving effect of the rolling resistance is unfavorably lost. Particularly, the use of the ester type plasticizer with the naphthenic or paraffinic softener is desirable because the large effect on the running performances on snow and ice roads and the rolling resistance is produced.

As the ester type low-temperature plasticizer, mention may be made of derivatives of phthalic acid such as phthalic diester and the like; fatty acid type monobasic acid esters such as derivatives of oleic acid and the like; fatty acid type dibasic acid esters such as derivatives of adipic acid, azelaic acid, sebacic acid, phosphoric acid and the like; and so on. Among them, the derivatives of oleic acid such as butyl oleate, octyl oleate, decyl oleate, fatty acid octyl of tall oil, oleyl oleate, ethylene glycol oleic diester, 1,4-butanedial oleic diester, 1,6-hexanediol oleic diester, 2-ethylhexyl oleate, dodecyl oleate, decyl myristoleate and oleyl myristoleate are most preferable, and particularly the use of octyl oleate is preferable. On the other hand, the naphthenic or paraffinic softener contains not less than 30% of aromatic hydrocarbon and has a viscosity gravity constant (VGC) of not more than 0.900, which includes Sonic Process Oil P-200, R-1000 and R-200 (trade name, made by Kyodo Sekiyu Co., Ltd.), Diana Process Oil KL-2P, MM-45, KL-1 and KM-90 (trade name, made by Idemitsu Kosan Co., Ltd.), Mitsubishi 10 Light Process Oil (trade name, made by Mitsubishi Oil Co., Ltd.), Mitsubishi 12 Medium Process Oil (trade name, made by Mitsubishi Oil Co., Ltd.), Mitsubishi 20 Light Process Oil (trade name, made by Mitsubishi Oil Co., Ltd.) and the like. If necessary, a tackifier, an aromatic softener containing not less than 30% of aromatic hydrocarbon and having a VGC of not less than 0.900, and the like may be added.

In addition, the rubber composition are properly compounded with other additives used in the usual rubber composition such as a vulcanizer, a vulcanization accelerator, an accelerator activator, an antioxidant and the like.

Although the object of the invention is achieved by using the rubber composition as constructed above in the tread, it is important that in order to control the running performances on snow and ice roads, E' at −20° C. is not more than 260 kg/cm², preferably not more than 220 kg/cm² and E' at 0° C. is not more than 190 kg/cm², preferably not more than 150 kg/cm² and also the change of E' in this temperature range is small for keeping the running performances on snow and ice roads under various circumstances. The term "E'" used herein expresses a dynamic storage modulus.

Next, in order to control the wet skid resistance, it is desirable that the loss tangent (tan δ) at 0° C. is not less than 0.3, preferably not less than 0.33 and in order to control the rolling resistance, it is desirable that tan δ at 60° C. is not more than 0.20, preferably not more than 0.17.

Furthermore, when a tread structure of cap tread rubber/base tread rubber is applied to the invention as a technique for further improving the rolling resistance without deteriorating the running performances on snow and ice roads and the wet skid resistance, these performances are preferably more improved. In this case, it is possible to use the rubber composition according to the invention as the base tread rubber composition so as to differ from the composition of the cap tread rubber.

The following examples are given in the illustration of the invention and are not intended as limitations thereof.

EXAMPLE

Rubber compositions having a compounding recipe (parts by weight) as shown in the following Table 1 were prepared, and then E' at −20° C., 0° C. and tan δ at 0° C., 60° C. were measured by means of a spectrometer and the Lambourn abrasion was evaluated at a slipping rate of 10% under a load of 2.5 kg to obtain results as shown in the following Table 2 prior to the evaluation of tire. Then, 13 rubber compositions were selected from the above rubber compositions, each of which was used as a tread rubber to produce a tire having a size of 165 SR13. The tread gripping force against snow and ice roads, wet skid resistance, wear resistance and rolling resistance for each tire were evaluated by the actual running test in the following methods to obtain results as shown in Table 2.

METHOD OF EVALUATION (1) Tread gripping force against snow and ice road surfaces With respect to the braking performance, a vehicle provided with the test tire was run on snow and ice roads at a speed of 20 km/hr, 30 km/hr or 40 km/hr and thereafter subjected to rapid braking at the above speed. Then, a running distance required for completely stopping the vehicle was defined by an index on the basis that the tire of Comparative Example 1 is 100.

(2) Wet skid resistance

A vehicle provided with the test tire was run on a wet asphalt road at a speed of 40 km/hr, 70 km/hr or 100 km/hr and thereafter subjected to rapid braking at the above speed. Then, a running distance required for completely stopping the vehicle was defined by an index on the basis that the tire of Comparative Example 1 is 100. The larger the index value, the better the wet skid resistance.

(3) Rolling resistance

The test tire subjected to an internal pressure of 1.7 kg/cm$^2$ was warmed up on a steel drum with a diameter of 1,707.6 mm and a width of 350 mm, which was rotated by the driving of a motor, at a speed of 80 km/hr under a load of 385 kg for 30 minutes and thereafter the rotating speed of the drum was raised to 200 km/hr. Then, the driving of the motor was stopped to run the drum by inertia, during which the rolling resistance of the tire to the drum at a speed of 50 km/hr was measured on a basis of deceleration speed of drum and time change. Next, a net rolling resistance of the tire was determined by subtracting the previously calculated drum resistance from the measured value. In this case, the resulting value was represented by an index on the basis that a value of Comparative Example 1 is 100. The larger the index value, the better the rolling resistance.

(4) Wear resistance (a) In addition to the tires used for the evaluation of controllability and stability, a test tire was produced by circumferentially the tread of the tire into two portions at its widthwise direction and making one portion of them from the rubber composition of Comparative Example 1. Then, a vehicle provided with this test tire was run on a paved road over a distance of 20,000 km, from which a running distance required for abrasion of 1 mm was calculated. The resulting value was represented by an index on the basis that a value of Comparative Example 1 is 100. The larger the index value, the better the wear resistance.

(b) The Lambourn abrasion in the rubber composition to be tested was evaluated in laboratory. First, the rubber composition was cured for a period of 1.2 times longer than that resulting in maximum value of torque in a rheometer and then subjected to the Lambourn abrasion tester at a slipping rate of 10% under a load of 4.5 kg. The resulting value was represented by an index on the basis that a value of Comparative Example 1 is 100. The larger the index value, the better the wear resistance. After this evaluation, the selected rubber composition was subjected to the above mentioned actual running test for the evaluation of the wear resistance.

(5) Measurement for E', tan δ

E' and tan δ were measured by means of a viscoelastic spectrometer (made by Iwamoto Seisakusho Co., Ltd.) at a frequency of 50 Hz under a condition that a dynamic strain is 1% under static elongation strain of 5%. In this case, a strip-like sample having a length between checks of 20 mm, a width of 5 mm and a thickness of 2 mm was prepared from the rubber composition. The curing conditions were the same as in the item (4)-(b).

TABLE 1

|  | Content of bound styrene % | Butadiene unit % cis-1,4 | Butadiene unit % trans-1,4 | Butadiene unit % vinyl | Bound styrene % × 1.7 + vinyl % |
|---|---|---|---|---|---|
| SBR-1 | 25.0 | 19 | 33 | 48 | 90.5 |
| 2 | 25.0 | 25 | 42 | 33 | 75.5 |
| 3 | 20 | 13 | 22 | 65 | 99.0 |
| 4 | 10.0 | 7 | 14 | 79 | 96.0 |
| 5 | 18.0 | 24 | 45 | 31 | 61.6 |
| 6 | 25.0 | 6 | 10 | 84 | 126.5 |
| 7 | 23.5 | 16 | 66 | 18 | 58.0 |
| 8 | 12.0 | 17 | 65 | 18 | 38.4 |
| BR-9 | 0 | 95 | 3 | 2 | 2 |
| 10 | 0 | 3 | 6 | 91 | 91 |

|  | Iodine adsorption value | DBP adsorption |
|---|---|---|
| N 339 | 89 | 121 |
| N 330 | 82 | 103 |
| N 550 | 42 | 120 |
| N 220 | 122 | 114 |
| N 326 | 83 | 70 |

| | Comparative Example 1 | Comparative Example 2 | Comparative Example 3 | Comparative Example 4 | Comparative Example 5 | Comparative Example 6 | Example 1 | Example 2 | Example 3 | Example 4 | Example 5 | Example 6 | Example 7 | Example 8 | Example 9 |
|---|---|---|---|---|---|---|---|---|---|---|---|---|---|---|---|
| SBR-1 | | | | | | | 40 | | | | | | 60 | | |
| 2 | | | | | | | | 40 | | | | | | 60 | |
| 3 | | | | | | | | | 40 | | | | | | 60 |
| 4 | | | | | | | | | | 40 | | | | | |
| 5 | | | | | | | | | | | 40 | | | | |
| 6 | | | | | | | | | | | | 40 | | | |
| 7 | | | | 40 | | | | | | | | | | | |
| 8 | | | 40 | | | | | | | | | | | | |
| BR-9 | 50 | | | | | 60 | | | | | | | | | |
| 10 | 50 | | | 40 | 40 | 30 | 50 | 50 | 50 | 50 | 50 | 40 | 30 | 30 | 30 |
| NR (RSS#4) | | | | | 20 | 10 | 10 | 10 | 10 | 10 | 10 | 10 | 10 | 10 | 10 |
| Cl-IIR (HT-1068) | | 100 | | | | | | | | | | | | | |
| Br-IIR (Polyser-X2) | | | | | | | | | | | | | | | 50 |
| N 339 | 85 | 60 | 50 | 50 | 50 | 50 | 50 | 50 | 50 | 50 | 50 | 50 | 50 | 50 | |
| N 330 | | | 10 | 10 | 10 | 10 | 10 | 10 | 10 | 10 | 10 | 10 | 10 | 10 | |
| Aromatic oil | 40 | 15 | | | | | | | | | 6 | | | | |
| Naphthenic oil | | | 6 | 6 | 6 | 6 | 6 | 6 | 2 | 6 | 2 | 2 | 2 | 2 | 6 |
| Butyl oleate | | | | | | | | | 4 | | 4 | 4 | 4 | 4 | 1 |
| Dioctyl phthalate | 1 | 1 | 1 | 1 | 1 | 1 | 1 | 1 | 1 | 1 | 1 | 1 | 1 | 1 | 1 |
| Stearic acid | 3 | 3 | 3 | 3 | 3 | 3 | 3 | 3 | 3 | 3 | 3 | 3 | 3 | 3 | 3 |
| Zinc oxide (ZnO) | 1 | 1 | 1 | 1 | 1 | 1 | 1 | 1 | 1 | 1 | 1 | 1 | 1 | 1 | 1 |
| Antioxidant IPPD *1 | 0.3 | 0.3 | 0.2 | 0.2 | 0.2 | 0.2 | 0.2 | 0.2 | 0.2 | 0.2 | 0.2 | 0.2 | 0.3 | 0.3 | 0.3 |
| Vulcanization accelerator DPG *2 | 0.3 | 0.3 | 0.4 | 0.4 | 0.4 | 0.4 | 0.4 | 0.4 | 0.4 | 0.4 | 0.4 | 0.4 | 0.35 | 0.35 | 0.35 |
| Vulcanization accelerator DM *3 | 1.0 | 0.4 | 0.5 | 0.5 | 0.5 | 0.5 | 0.5 | 0.5 | 0.5 | 0.5 | 0.5 | 0.5 | 0.5 | 0.5 | 0.5 |
| Vulcanization accelerator Nobs *4 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
| Sulfur | | | | | | | | | | | | | | | |

|  | Example 10 | Example 11 | Example 12 | Example 13 | Example 14 | Example 15 | Comparative Example 7 | Comparative Example 8 | Comparative Example 9 | Example 16 | Example 17 | Comparative Example 10 |
|---|---|---|---|---|---|---|---|---|---|---|---|---|
| SBR-1 | 60 | | | | | | | | | | | |
| 2 | | 60 | | | | | | | | | | |
| 3 | | | 60 | | | | | | | | | |
| 4 | | | | 60 | | | | | | | | |
| 5 | | | | | 40 | 40 | 40 | 40 | 60 | 60 | 60 | 60 |

|  | Content of bound styrene % | Butadiene unit % cis-1,4 | Butadiene unit % trans-1,4 | Butadiene unit % vinyl | Bound styrene % × 1.7 + vinyl % |
|---|---|---|---|---|---|
| SBR-1 | 25.0 | 19 | 33 | 48 | 90.5 |
| 2 | 25.0 | 25 | 42 | 33 | 75.5 |
| 3 | 20 | 13 | 22 | 65 | 99.0 |
| 4 | 10.0 | 7 | 14 | 79 | 96.0 |
| 5 | 18.0 | 24 | 45 | 31 | 61.6 |

TABLE 1-continued

| | | | | | | | | | | |
|---|---|---|---|---|---|---|---|---|---|---|
| | Iodine adsorption value | DBP absorption | | | | | | | | |
| NR (RSS#4) | | | 30 | 30 | 30 | 30 | 40 | 40 | 60 | 30 | 30 | 30 | 30 |
| Cl-IIR (HT-1068) | | | 10 | 10 | 10 | 10 | 20 | 20 | | 10 | 10 | 10 | 10 |
| Br-IIR (Polyser-X2) | | | | | | 60 | | | | | | | |
| N 339 | 89 | 121 | 50 | 50 | 50 | 50 | 50 | 50 | 50 | 50 | | | |
| N 330 | 82 | 103 | | | | | | | 50 | | 50 | | |
| N 550 | 42 | 120 | | | | | | | | | | | |
| N 220 | 122 | 114 | | | | | | | | | | 50 | |
| N 326 | 83 | 70 | | | | | | | | | | | 50 |
| Aromatic oil | | | | | | | | | | | | | |
| Naphthenic oil | | | 2 | 6 | 6 | 2 | | | | 2 | 2 | 2 | 2 |
| Butyl oleate | | | | | | | | | | | | | |
| Dioctyl phthalate | | | 4 | | | 4 | | | 4 | 4 | 4 | 4 | 4 |
| Stearic acid | | | 1 | 1 | 1 | 1 | 1 | 1 | 1 | 1 | 1 | 1 | 1 |
| Zinc oxide (ZnO) | | | 3 | 3 | 3 | 3 | 3 | 3 | 3 | 3 | 3 | 3 | 3 |
| Antioxidant IPPD *1 | | | 1 | 1 | 1 | 1 | 1 | 1 | 1 | 1 | 1 | 1 | 1 |
| Vulcanization accelerator DPG *2 | | | 0.3 | 0.3 | 0.3 | 0.3 | 0.2 | 0.2 | 0.3 | 0.3 | 0.3 | 0.3 | 0.3 |
| Vulcanization accelerator DM *3 | | | 0.35 | 0.35 | 0.35 | 0.35 | 0.4 | 0.4 | 0.3 | 0.35 | 0.35 | 0.35 | 0.35 |
| Vulcanization accelerator Nobs *4 | | | 0.5 | 0.5 | 0.5 | 0.5 | 0.5 | 0.5 | 0.8 | 0.5 | 0.5 | 0.5 | 0.5 |
| Sulfur | | | 1.8 | 1.8 | 1.8 | 1.8 | 1.8 | 1.8 | 1.8 | 1.8 | 1.8 | 1.8 | 1.8 |

Note:
*1 N—phenyl-N′—isopropyl-p-phenylenediamine
*2 diphenylguanidine
*3 dibenzothiazyldisulfide
*4 N—oxydiethylene-2-benzothiazolylsulfeneamide

TABLE 2

|  |  | Comparative Example 1 | Comparative Example 2 | Comparative Example 3 | Comparative Example 4 | Comparative Example 5 | Example 1 | Example 2 | Example 3 | Example 4 |
|---|---|---|---|---|---|---|---|---|---|---|
| Spectrometer | −20° C. E' (kg/cm$^2$) | 235 | 338 | 220 | 245 | 207 | 265 | 195 | 202 | 235 |
|  | 0° C. E' (kg/cm$^2$) | 151 | 189 | 145 | 155 | 138 | 168 | 130 | 136 | 148 |
|  | 0° C. tan δ | 0.36 | 0.38 | 0.31 | 0.40 | 0.27 | 0.40 | 0.33 | 0.36 | 0.37 |
|  | 60° C. tan δ | 0.27 | 0.24 | 0.21 | 0.23 | 0.20 | 0.19 | 0.15 | 0.15 | 0.18 |
|  | Lambourn abrasion index | 100 | 133 | 126 | 103 | 132 | 125 | 121 | 121 | 125 |
| Tire performance (all shown by index) | Rolling resistance | 100 | 103 | 107 |  | 108 | 110 | 118 | 118 |  |
|  | Brakability on ice | 100 | 85 | 102 |  | 104 | 96 | 105 | 104 |  |
|  | Brakability on snow | 100 | 83 | 101 |  | 103 |  | 105 | 103 |  |
|  | Brakability on wet road | 100 | 101 | 96 |  | 89 | 103 | 98 | 101 |  |
|  | Wear resistance | 100 | 119 | 110 |  | 120 |  | 114 | 113 |  |

|  |  | Example 5 | Example 6 | Example 7 | Example 8 | Example 9 | Example 10 | Example 11 | Example 12 | Example 13 |
|---|---|---|---|---|---|---|---|---|---|---|
| Spectrometer | −20° C. E' (kg/cm$^2$) | 229 | 198 | 212 | 202 | 185 | 189 | 250 | 238 | 197 |
|  | 0° C. E' (kg/cm$^2$) | 144 | 130 | 136 | 131 | 137 | 126 | 165 | 150 | 141 |
|  | 0° C. tan δ | 0.40 | 0.35 | 0.40 | 0.35 | 0.375 | 0.33 | 0.42 | 0.45 | 0.41 |
|  | 60° C. tan δ | 0.16 | 0.15 | 0.15 | 0.15 | 0.12 | 0.14 | 0.18 | 0.18 | 0.13 |
|  | Lambourn abrasion index | 120 | 127 | 130 | 131 | 127 | 129 | 130 | 129 | 125 |
| Tire performance (all shown by index) | Rolling resistance |  | 120 |  | 119 | 118 |  |  | 114 |  |
|  | Brakability on ice |  | 106 |  | 105 | 102 |  |  | 99 |  |
|  | Brakability on snow |  | 104 |  | 104 | 103 |  |  | 100 |  |
|  | Brakability on wet road |  | 100 |  | 79 | 101 |  |  | 106 |  |
|  | Wear resistance |  | 116 |  | 120 | 118 |  |  | 111 |  |

|  |  | Comparative Example 6 | Example 14 | Example 15 | Comparative Example 7 | Comparative Example 8 | Example 16 | Comparative Example 9 | Example 17 | Comparative Example 10 |
|---|---|---|---|---|---|---|---|---|---|---|
| Spectrometer | −20° C. E' (kg/cm$^2$) | 188 | 212 | 180 | 249 | 187 | 207 | 200 | 220 | 213 |
|  | 0° C. E' (kg/cm$^2$) | 122 | 135 | 129 | 162 | 124 | 130 | 126 | 138 | 134 |
|  | 0° C. tan δ | 0.28 | 0.41 | 0.40 | 0.50 | 0.25 | 0.41 | 0.42 | 0.41 | 0.40 |
|  | 60° C. tan δ | 0.17 | 0.14 | 0.12 | 0.27 | 0.12 | 0.13 | 0.11 | 0.17 | 0.15 |
|  | Lambourn abrasion index | 127 | 105 | 112 | 89 | 117 | 114 | 70 | 145 | 75 |
| Tire performance (all shown by index) | Rolling resistance |  | 120 |  | 100 |  |  |  |  |  |
|  | Brakability on ice |  | 103 |  | 97 |  |  |  |  |  |
|  | Brakability on snow |  | 103 |  |  |  |  |  |  |  |
|  | Brakability on wet road |  | 104 |  | 105 |  |  |  |  |  |
|  | Wear resistance |  | 102 |  |  |  |  |  |  |  |

In Table 1;
SBR-1-6: solution polymerized SBR
  SBR-1: S1215 (trade name), made by Shell,
  SBR-2-6: polymer produced on trial (SBR-3, 4 are type of coupling by Sn and a coupling efficiency is about 50%)
SBR-7, 8: emulsion polymerized SBR
  SBR-7: SBR 1500 (trade name), made by Japan Synthetic Rubber Co., Ltd.
  SBR-8: Uniroyal 1504 (trade name)
BR-9: JSR BR01 (trade name)
BR-10: polymer produced on trial (a type of coupling by Sn and a coupling efficiency of about 50%)
Cl-IIR (HT-1068): made by Exxon Chemical Company (trade name)
Br-IIR (Polyser X2): made by Polyser Ltd. (Polyser Bromobutyl X-2, trade name)

With respect to the microstructures of the polymer, the content of bound styrene was calculated by using the calibration curve of absorbance at 699 cm$^{-1}$ measured by means of a spectrophotometer, and the microstructures of butadiene unit were determined by a method of D. Morero "Chem. & Ind., 41, 758 (1959)".

In the Table 1, the rubber compositions of Comparative Examples 1 and 2 represent the usual embodiments of a tread rubber for snow tire and a tread rubber for summer tire, respectively.

Figure 2:
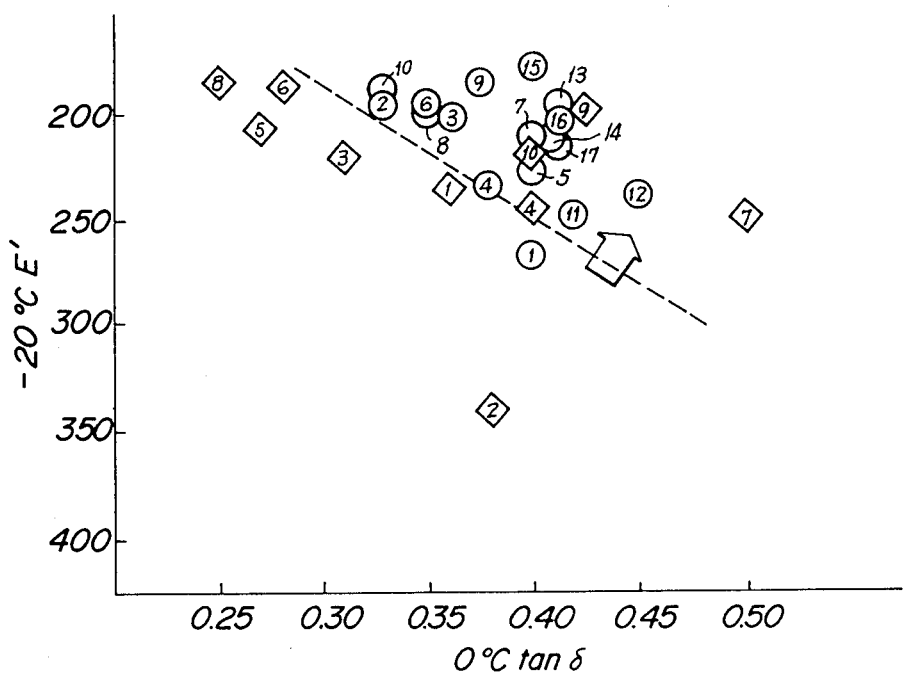
FIG. 2 is a graph showing a relation between tan $\delta$ at 0° C. and E' at −20° C. in the rubber composition of Examples.

In the rubber composition shown in the Table 1, a relation between tan δ at 0° C. and tan δ at 60° C. is shown in FIG. 1, and a relation between tan δ at 0° C. and E' at −20° C. is shown in FIG. 2. In the FIGS. 1 and 2, a mark "o" and a mark "□" are related to the rubber compositions used in Examples and Comparative Examples, respectively, wherein numerical numbers in the marks "o" and "□" are corresponded to Example number and Comparative Example number, respectively. In this case, the larger the value of tan δ at 0° C. is, the higher the wet skid resistance is. The smaller the value of tan δ at 60° C. is, the lower the rolling resistance is. Moreover, the smaller the value of E' at −20° C. is, the better the running performances on snow and ice roads are. As seen from FIGS. 1 and 2, the rubber compositions of Examples 1-17 are excellent in the rolling resistance, the wet skid reistance and the running performances on snow and ice roads. The tendency substantially similar to the relations shown in FIGS. 1 and 2 appears even in the evaluation of the tires as shown in Table 2, and the performances proportional to such relations are developed.

As mentioned above, in the tire according to the invention, the tread is composed of the rubber composition compounding a particular carbon black and, if necessary, an ester type plasticizer and/or a naphthenic or paraffinic softener with the aforementioned particular rubber blend, whereby the tread gripping force against snow and ice roads and the rolling resistance are considerably improved without deteriorating the tread gripping force against wet road as clarified from Tables 1 and 2, so that it is very effective as a pneumatic tire having a low fuel consumption and all-weather running performances.

What is claimed is:

1. A pneumatic tire having all-weather running performances, which comprises using in the tread thereof a rubber composition containing 30-80 parts by weight of carbon black having an iodine adsorption value (IA) of not less than 70 mg/g and a dibutyl phthalate (DBP) adsorption of not less than 90 ml/100 g and 2-30 parts by weight of an ester type plasticizer selected from the group consisting of phthalic acid derivatives, fatty acid type monobasic acid esters and fatty acid type dibasic acid esters, based on 100 parts by weight of a rubber blend consisting of 97-10 parts by weight of styrene butadiene rubber having a content of bound styrene of 0-30% and a content of vinyl bond in the butadiene unit of 25-95% (abbreviated as diene rubber-A hereinafter), 3-30 parts by weight of butyl rubber and/or halogenated butyl rubber, and 0-87 parts by weight of another diene rubber other than said diene rubber-A, wherein said rubber composition has a dynamic storage modulus (E') at −20° C. of not more than 260 kg/cm$^2$, a loss tangent (tan δ) at 0° C. of not less than 0.30 and a loss tangent (tan δ) at 60° C. of not more than 0.20.

2. The pneumatic tire according to claim 1, wherein said diene rubber-A satisfies 45≦1.7×bound styrene %+vinyl bond %≦120.

* * * * *